Jan. 10, 1933.  E. C. SAINT-JACQUES  1,893,913
PROCESS AND APPARATUS FOR THE ROASTING OR CALCINATION OF PULVERULENT MATTERS
Filed April 2, 1932
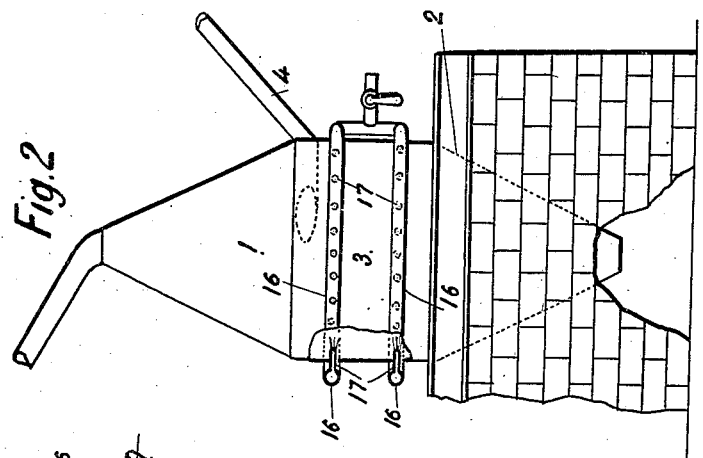
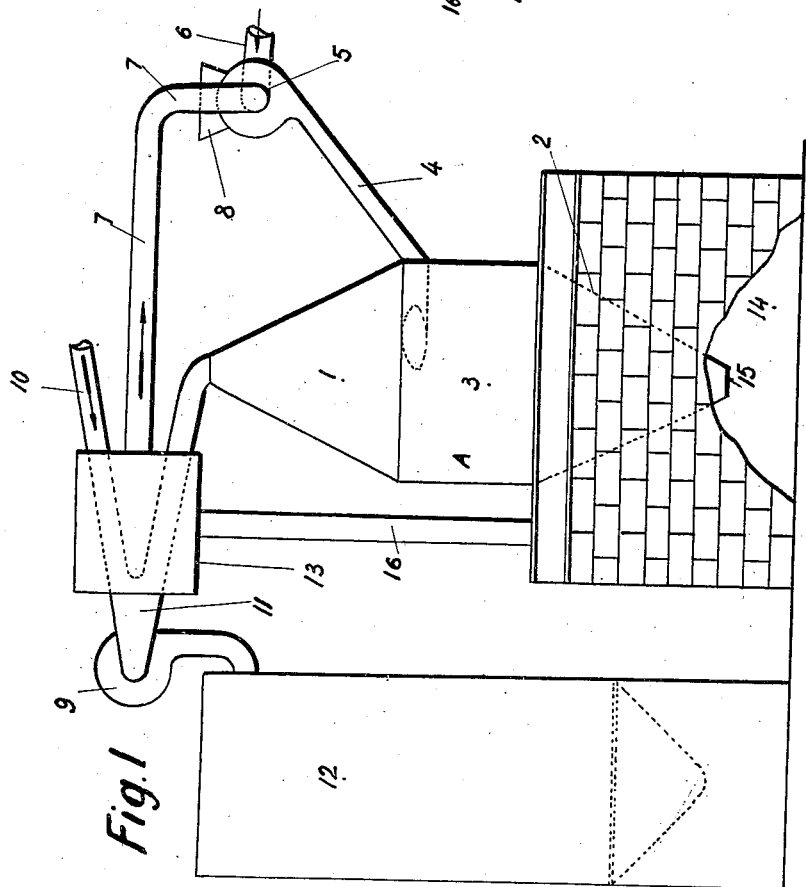

Patented Jan. 10, 1933

1,893,913

UNITED STATES PATENT OFFICE

EUGÈNE CAMILLE SAINT-JACQUES, OF PARIS, FRANCE

PROCESS AND APPARATUS FOR THE ROASTING OR CALCINATION OF PULVERULENT MATTERS

Application filed April 2, 1932. Serial No. 602,858, and in France February 26, 1931.

I have filed an application in France February 26, 1931.

The present invention has for its object a process and a device for the roasting or calcination of pulverulent matters.

Said process may be used for making practicable any operations of oxidization, reductions and the like on pulverulent matters; it may be used in particular for oxidizing sulphur or carbon, for reducing sulphate of lime, for reducing with volatilization the matters containing zinc in order to obtain oxide of zinc, for oxidizing iron in order to transform $Fe_2O_3$ into $Fe_3O_4$ and so on.

Said process consists essentially in bringing in suspension the pulverulent matter to be treated inside of the combustible gas or gas of combustion which is itself designed for ensuring its roasting or calcination, and in impressing to this mixture of gas and pulverulent matters set in motion a gyration while an aspiration in an upward direction is produced on the axis of the circular trajectory followed by the mixture.

Owing to said combination of the gyration impressed to the mixture of gas and pulverulent matters (gyration which allows the mixture to travel over a long space but over a small height), with an aspiration in an upward direction, on one hand a rational stirring up of the gases and matters is produced, and on the other hand the fall by gravity of the matters is slackened, which causes the time during which the gas and matters are in contact with one another to be long enough for producing the roasting or calcination of said matters as wholly as possible.

At the same time, an effect of separating or horizontal classifying of the matters is produced which, by increasing their dispersion inside the gaseous flow, makes more intimate their contact with the combustion gases which causes the roasting to be more complete.

The upward aspiration in the direction of the axis of the whirling motion of gases and matters, aspiration which may be obtained by means of a ventilator, produces as explained above, a separation or horizontal classification of the matters the effect of which is that the biggest and heaviest matters may follow the gyration and fall by gravity whereas the thinnest and lightest matters are carried along by the upward aspiration with the combustion gases.

This may be of interest in some treatments, particularly in the treatment of iron ores in order to separate them from the silica that may be contained in them.

Lastly air or combustible gases or gases of combustion may be added, either inside the mixture of gas and matters during its gyration, or on the axis of the trajectory followed by the mixture in order to participate in the combustion, and increase the slackening of the fall of the matters.

For instance if the object is the treatment of matters containing zinc in order to obtain oxide of zinc, said matters, in pulverulent form, shall be brought in suspension in the flow of gas which must at first burn them with reduction and form metallic zinc during its gyration, after that a flow of air carried along by the aspiration shall oxidize these vapours of metallic zinc and transform them into ZnO.

If the object is to oxidize sulphur, it shall be brought, in pulverulent state, in a flow of air which shall calcine it, and which is given a whirling motion. Air may be also aspirated in the center of said whirl wind in order to complete the calcination of the particles of sulphur.

If the object is to oxidize iron ores, they shall, in pulverulent form, be brought into suspension in a flow of oxidizing gas which must roast them with oxidation, and the air flow, blown in the center of the whirling motion impressed on the mixture, shall complete said oxidation.

The mixture shall be ignited when entering in the apparatus by any suitable means.

For applying said process, it will be possible in particular to utilize an apparatus constituted by two opposed cones connected for example by a cylindrical portion and to inject tangentially into the interior of this cylindrical portion or at the connection of the cones the combustible gas or gas of combustion containing in suspension the metallic ore or compound previously finely ground.

This combustible gas is thereby given a movement, in the interior of the apparatus, of spiral gyration.

A ventilator connected with the apex of the upper cone produces a depression on the axis of the apparatus and in the same time reentrances of air either at the bases of the device or at any other part thereof.

In the cylindrical part of the apparatus which may have a variable height, may be disposed above and under the tangential ports for admission of the mixture of matters and gases other ports for air and gases (preferably tangential ones in order to increase the whirling motion of the mixture); for that purpose burners connected with a distributor provided with adjustable means may be used, it is also possible to increase the combustion zone of the apparatus especially when combustible gases shall be used.

In the accompanying drawing is represented diagrammatically and by way of example a device in accordance with the invention, assumed to be applied to the treatment of zinc ores and compounds.

A is the apparatus for combustion and reduction, or burner chamber or main reaction chamber, constituted by two cones 1 and 2 with their bases opposed and connected by a cylindrical portion 3 on which are distributed tangentially one or more pipes 4 through which penetrates into the burner the combustible gas having in suspension the zinc ore or compound previously ground sufficiently finely in order to offer a maximum surface to the action of reduction; this latter will therefore require the minimum quantity of heat.

In order to inject the combustible gas containing in suspension the zinc ore or compound finely ground it is possible to utilize an aspirator-ventilator (blower) 5 which aspirates at 6 combustible gas (producer gas, acetylene, town gas or the like) mixed with air for combustion arriving at 7; a hopper 8 allows the zinc ore or compound which is finely ground to flow constantly into the gaseous current thus aspirated and then transmitted through 4.

It should be also possible to introduce the matters to be treated by a nozzle between the ventilator and the burner.

Instead of combustible gas it would also be possible to aspirate pulverized coal in which would be brought into suspension the pulverized ore or compound of zinc.

Combustion air likewise penetrates into the apparatus at the apex of the lower cone 2. Finally the aspirating tube of a ventilator 9 is in communication with the apex of the upper cone 1.

In the interior of the reaction chamber A, the current of combustible gas and air for combustion having in suspension the finely divided zinc ore or compound is ignited and takes up a gyratory movement in a spiral from top to bottom. In the course of this spiral gyration the zinc particles have the whole time for reduction in contact with the gas in combustion and the zinc vapours produced and also the particles of zinc formed are aspirated by the ventilator 9 which at the same time, aspirates through 10 a certain quantity of air, sufficient to burn these particles in a secondary or supplemental reaction chamber 11 and to oxidize these vapours before their introduction into the ventilator; this latter transmits the vapours of ZnO formed into a condensation chamber 12 where they are deposited and collected.

There may be placed around the oxidation chamber 11 a double heating chamber or jacket 13 in which the combustion air circulates and is heated prior to its aspiration in 7.

In the case of the volatilization of the zinc and oxidation of the vapours, instead of aspirating the vapours of ZnO formed, the ventilator 9 may aspirate air by one of its inlets and the zinc vapours and particles by its other inlet, if care is taken to arrange matters suitably for this purpose by separating into two parts by a fixed or movable partition the vaned turbine of this ventilator. The mixture of air and metallic vapours and particles will then only be produced in the transmission tube of the ventilator which will prevent the vanes of this latter from being subjected to the injurious influence of the exothermic reaction resulting. This arrangement will in addition have the advantage of permitting the air thus penetrating one half of the vanes of the ventilator to cool these latter which the gases at an elevated temperature derived from the chamber A tend to overheat.

All known means can be utilized in order to facilitate the condensation of the oxide of zinc.

It may be noted that the aspiration from bottom to top produced by the ventilator 9 in the chamber A has for its effect to arrest the fall by gravity of the grains of ore or compound treated in this burner and thus to give to the latter all the time necessary for reduction before attaining the bottom of the burner. This arresting action is further accentuated by the aspiration of combustion air which is produced as has been seen above by the lower orifice 15 of the chamber A, this arrangement assuring in fact a permanent current of decreasing pressure, from bottom to top in the burner, which current will likewise permit any light particles to separate from heavier particles if a separation is desired.

The constituents of the ore or the like which remain solid after reduction fall into a receptacle 14 where they are collected.

The receptacle 14 may be placed in communication for example by a tube 16 with the heating chamber or jacket 13 for heating the air in said chamber 13 by air from the receptacle 14 in such a manner as to aspirate in 15 air from receptacle 14 which has already been heated by the hot solid particles of the ore deposited therein or by other suitable means.

It is possible finally to perforate the lower cone 2 of the apparatus or to provide therein vertical slots in a tangential direction and if desired to perforate also the cylindrical portion 3 in order to obtain entries of supplementary air into the apparatus under the influence of the diminution of pressure which is produced from bottom to top in this latter in the manner described above. These supplementary entries of air have the effect of detaching the metallic particles from the non-volatile constituents with which they may possibly be entrained and to bring them back towards the axis of the burner from which point they are taken up in the ascending current. There results a horizontal separation of the materials, the heavier constituents (non-volatile) being particularly subjected to the centrifugal movement and the volatile constituents to the diminution of pressure produced by the ventilator 9. This separation assures a more accurate separation of the non-volatile constituents (affected by gravity) and the volatile elements (entrained in the ascending low-pressure current).

From the modification shown in Figure 2, it is seen how there may be disposed around the cylindrical portion 3, under the level of pipe 4, one or two gas distributors 16 each feeding a series of burners 17 in order to assure a perfect contact of ore with combustible gas or gas of combustion throughout its entire passage through this cylindrical portion 3.

What I claim is:

1. The process of treating pulverulent materials in a vertical reaction chamber, which consists in forming in said chamber a gyrating flame of a combustion gas containing in suspension the solid material in a finely divided state, and instituting in said chamber a positive upward suction pull on the gyrating flame in line with the axis of gyration.

2. The process of treating pulverulent materials in a vertical reaction chamber, which consists in forming in said chamber a gyrating flame of a combustion gas containing in suspension the solid material in a finely divided state, inducing in said chamber a direct upward suction pull on the gyrating flame in line with the axis of gyration, and admitting to the chamber below the gyrating flame a permanent current of supplemental combustion gas traveling upward with the flame toward the suction zone at progressively decreasing pressure.

3. The method of treating solid volatile pulverulent materials in a vertical reaction chamber for volatilization thereof and oxidation of the vapor, which consists in forming in said chamber a gyrating flame for a combustion gas containing in suspension the solid material in a finely divided condition, inducing in said chamber an upward suction pull on the flame in the line of the axis of gyration so as to effect a horizontal classification of the constituents of different specific gravity and volatilization of the particles of the solid volatile material, and the oxidation of the vapors in their travels, drawing off and collecting and condensing the vapor, and admitting to the chamber below the gyrating flame a permanent current of supplemental combustion gas traveling upward with the flame toward the suction zone at progressingly decreasing pressures.

4. A device for heat treating pulverulent materials comprising a vertical main reaction chamber formed of two superposed cones arranged in apposition, means for admitting a combustible gas and finely divided pulverulent material suspended therein into the chamber at the juncture of the cones, a supplementary reaction chamber arranged above the main reaction chamber, a suction pipe connecting said supplementary chamber with the apex of the upper cone, an oxidizing fluid supply pipe connected with the supplementary chamber, and a suction and discharge fan connected to said supplementary chamber and pipes.

5. A device for heat treating pulverulent materials comprising a vertical main reaction chamber formed of two superposed cones arranged in apposition, means for admitting a combustible gas and finely divided pulverulent material suspended therein into the reaction chamber at the juncture of the cones, a supplementary reaction chamber arranged above the main reaction chamber, a suction pipe connecting said supplementary chamber with the apex of the upper cone, an oxidizing fluid supply pipe connected with the supplementary chamber, a suction and discharge fan connected to said supplementary chamber and pipes, a heating chamber surrounding said pipes, and a pipe leading therefrom to said means for admitting the combustion gas and pulverulent material to the main reaction chamber.

6. A device for heat treating pulverulent materials comprising a vertical main reaction chamber formed of two superposed cones arranged in apposition, means for admitting a combustible gas and finely divided pulverulent material suspended therein into the main reaction chamber at the juncture of the cones, a supplementary reaction chamber arranged above the main reaction chamber, a suction pipe connecting said supplementary chamber with the apex of the upper cone, an oxidizing fluid supply pipe connected with the supplementary chamber, a suction and discharge fan connected to said supplementary chamber and pipes, a bottom chamber communicating with the apex of the lower cone, a heating chamber surrounding the aforesaid pipes, an air pipe leading from the bottom chamber to the heating chamber, and a pipe leading from said heating chamber to said means for admitting the combustion gas and pulverulent material to the main reaction chamber.

In testimony whereof I have signed this specification.

EUGÈNE CAMILLE SAINT-JACQUES.